United States Patent [19]

Ohno et al.

[11] Patent Number: 5,597,998

[45] Date of Patent: Jan. 28, 1997

[54] RECORDING MEDIUM USING REVERSIBLE RECORDING MATERIAL AND METHOD OF PROCESSING RECORD TO RECORDING MEDIUM

[75] Inventors: Tadayoshi Ohno; Shinichi Itoh; Takashi Yamaguchi; Hisatoshi Tanaka, all of Kawasaki, Japan

[73] Assignee: Kabushiki Kaisha Toshiba, Kawasaki, Japan

[21] Appl. No.: 520,086

[22] Filed: Aug. 28, 1995

Related U.S. Application Data

[62] Division of Ser. No. 309,634, Sep. 21, 1994.

[30] Foreign Application Priority Data

Sep. 22, 1993 [JP] Japan .................... 5-236691

[51] Int. Cl.⁶ .................... G06K 19/00; G06K 5/00; B41M 5/20
[52] U.S. Cl. .................... 235/487; 235/380; 503/201; 503/204
[58] Field of Search .................... 235/483, 380, 235/440, 494; 503/201, 204, 208, 209, 217; 438/484

[56] References Cited

U.S. PATENT DOCUMENTS

| | | | |
|---|---|---|---|
| 4,401,721 | 8/1983 | Hida | 428/484 |
| 5,055,662 | 10/1991 | Hasegawa | 235/380 X |
| 5,151,582 | 9/1992 | Fujioka | 235/469 |
| 5,196,646 | 3/1993 | Kunimoto | 235/449 |
| 5,298,476 | 3/1994 | Hotta et al. | 503/201 |
| 5,321,239 | 6/1994 | Masubuchi et al. | 235/380 |
| 5,376,616 | 12/1994 | Hamano et al. | 503/216 |
| 5,419,999 | 5/1995 | Uejima | 430/290 |
| 5,471,044 | 11/1995 | Hotta et al. | 235/487 X |
| 5,472,929 | 12/1995 | Inoue et al. | 502/204 |
| 5,489,494 | 2/1996 | Hottan et al. | 430/19 |

FOREIGN PATENT DOCUMENTS

| | | | |
|---|---|---|---|
| 6417471 | 1/1989 | Japan | 235/487 |
| 3116594 | 5/1991 | Japan | 235/487 |
| 3212790 | 9/1991 | Japan | 235/487 |
| 3218898 | 9/1991 | Japan | 235/487 |
| 4126277 | 4/1992 | Japan | 235/380 |
| 5139079 | 6/1993 | Japan | 235/487 |

*Primary Examiner*—Donald T. Hajec
*Assistant Examiner*—Thien Minh Le
*Attorney, Agent, or Firm*—Cushman Darby & Cushman, L.L.P.

[57] ABSTRACT

A data storing medium comprising a substrate, a first display portion, provided on the substrate, for displaying predetermined data, the first display portion having a first recording material storing data by first recording energy and erasing stored data of history of the use by predetermined erasing energy, and a second display portion, provided on the substrate, for displaying the same data as displayed by the first display portion, the second display portion having a second recording material for storing the data by a second recording energy different from the first recording energy, and stored data being impossible to be erased.

6 Claims, 7 Drawing Sheets

FIG. 10

RECORDING MEDIUM USING REVERSIBLE RECORDING MATERIAL AND METHOD OF PROCESSING RECORD TO RECORDING MEDIUM

This is a division of application Ser. No. 08/309,634, filed Sep. 21, 1994.

BACKGROUND OF THE INVENTION

1. Field of the Invention

The present invention relates to a recording medium and a method of processing record to the recording medium, and particularly to a recording medium whose display is improved to be stabilized and a method of processing record to the recording medium.

2. Description of the Related Art

In recent years, a magnetic card having a data memory portion and an IC card have mean widely used in the field of telephone cards, prepaid cards, and ID cards, etc. However, there have been problems such as forged or altered cards, or illegal use of the cards in accordance with the spread of these cards. In these recording medium, processing of the state of using the card is invisibly performed based on recording data by a processor. Therefore, in a case that there is doubt of an act of using a recording medium, data must be displayed on a display by the processor. Due to this, a user does not always obtain the satisfactory understanding of the doubt.

In order to solve the above problem, there is proposed a system in which a display is provided in a recording medium to display a part of data of a memory in order that the user of the recording medium can confirm data of the state of using the card without using the processor. According to the above recording medium and the system, the user can directly confirm the state of using the card. Also, the user can collate data of the recording medium and display data to confirm data. Due to this, high reliability can be obtained from the user. Regarding such a system, various proposals have been made (Japanese Utility Model Application KOKAI Publication No. 1-17471, Japanese Patent Application KOKAI Publication No. 3-212790, etc.). However, since the recording medium is repeatedly used in general, there occurs a case that sufficient data cannot be recorded and displayed in the display necessary number of times.

In order to deal with such a case, there as been proposed a recording medium in which a reversible recording material is sued in a recording portion bas been proposed (Japanese Patent Application KDKAI Publication Nos. 3-116594, 3-218898, etc.). Moreover, Japanese Patent Application KOKAI Publication No. 5-139079 proposes a magnetic recording medium which is formed by providing an unreversible heat-sensitive recording layer as a lower layer and a reversible heat-sensitive recording, layer as an upper layer on one surface of a base material. According to the above rereading medium, rewritable data end data to be stored can be selectively recorded. Such a recording medium is excellent in the point that an image can be repeatedly recorded and erased. However, the image, as such, can be easily rewritten and altered. Due to this, there is a problem in that security of the recording medium cannot be fully maintained.

SUMMARY OF THE INVENTION

An object of the present invention is to provide a data storing medium which can display data of the history of its use and which has a high security.

According to a first aspect of the present invention, there is provided a data storing medium comprising a substrate, a first display portion, provided on the substrate, for displaying predetermined data, the first display portion having a first recording material storing data by first recording energy, and erasing stored data of history of the use by predetermined erasing energy, and a second display portion, provided on the substrate, for displaying the same data as displayed by the first display portion, the second display portion having a second recording material for storing the data by a second recording energy different from the first recording energy, and stored data being impossible to be erased.

According to the data recording storing medium of the present invention, since a plurality of display portions whose recording conditions are different are provided, data can not be recorded in all display portions under a single condition. Due to this, there can be provided higher security against forgery and false use as compared with prior art.

According to a second aspect of the present invention, there is provided a data storing medium comprising, a substrate, a first display portion, provided on the substrate, for displaying predetermined data, the first display portion having a first recording material storing data by first recording energy, and erasing stored data of history of the use by predetermined erasing energy, a second display portion, provided on the substrate, for displaying predetermined data, the second display portion having a second recording material for storing data by a second recording energy different from the first recording energy, and erasing data by second erasing energy different from the first erasing energy.

According to the data storing medium of the present invention, the first recording energy and the second erasing energy for rewriting the first display portion are different from the second recording energy and the second erasing energy for rewriting the second display portion. Due to this, even if a person know either one of the values, the image of the other display portion cannot be rewritten. Therefore, security against forgery and false use can be improved.

According to a third aspect of the present invention, there is provided a method of processing a data storing medium comprising the steps of: discriminating which display portion of the first and second display portions should be rewritten, and rewriting first or second predetermined data of the first or second display portion in accordance with the discrimination result of the discriminating step based on the first recording energy, or the second recording energy, or the erasing energy.

According to the above method, the processing of the data storing medium can be surely provided as keeping security against the forgery and false use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed descrip

DETAILED DESCRIPTION OF THE PREFERRED EMBODIMENTS

Embodiments of the present invention will be explained with reference to the drawings.

Figure 1:
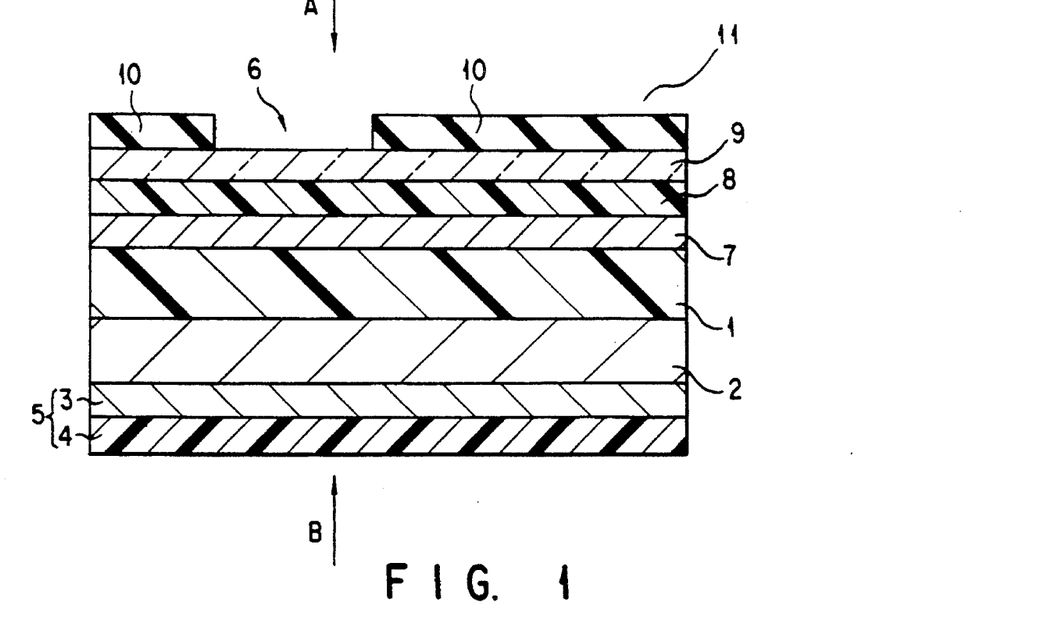
- FIG. 1 is a cross sectional view schematically showing a recording medium of a first embodiment of the present invention.

FIG. 1 is a cross sectional view schematically showing a recording medium having two display portions according to a first embodiment of the present invention. In FIG. 1, a recording medium 11 of the present invention comprises a base material having a thickness of about 10 µm to several mm, and being formed of white vinyl chloride and polyester. On one surface of the recording medium 11, a magnetic recording layer 2, serving as a memory portion, is provided. On the magnetic layer 2, a thin metallic tin layer 3, and a protection layer 4, made of thermoplastic resin, are sequentially formed. The tin layer 3 and the protection layer 4 forms a metal breakage heat-sensitive recording layer 5, serving as a first display portion (hereinafter called as display portion B).

On the other surface of the base material 1, a reflection layer 7, made of an aluminum thin layer, and a variable recording layer 8 are formed. These reflection layer 7 and variable recording layer 8 form a second display portion (hereinafter called as display portion A). The variable recording layer 8 uses material, which has a characteristic to be described later, and which reversibly shows an opaque state and a transparent state. On the variable recording layer 8, a protection layer 9 having penetrability and a preprinting layer 10 on which fixed data is printed are sequentially formed.

In the magnetic recording layer 2, there are stored fixed data in which the use of the recording medium is specified, for example, a sum of money, which can be used in a case of a prepaid card, and variable data of history of the use, for example, the remainder of the money, usable date. Further, in the recording medium of the present invention, a recording condition of the display portion is stored.

On the display portions A and B, display data of the history of the use. However, as described later, the feature of the recording medium is that the display portions A and B have a different recording characteristics. The display portion B occupies the entire one of surfaces of the recording medium. In recording to the display portion B, the metallic tin layer 3 is selectively melted to be broken in accordance with printing data by heat-sensitive recording means, ant magnetic recording layer 2 of the broken portion is exposed. Then, an image is recorded by contrast between the existence of the exposure and the non-existence thereof. Since a melting point of tin forming the recording layer is high, i.e., 232° C., a permanent image has an extremely high certainty of printing as compared with the other heat-sensitive recording material.

The display portion A is formed in a part of the other surface of the recording medium. In the display portion A, recording and erasing can be repeatedly performed. The material forming the variable recording layer 8 is a material, which can reversibly convert the transparent state and the obscure state by the temperature provided to the material (as disclosed in Japanese Patent Application KOKAI Publication No. 55-154198).

In the transparent state, if the temperature of the material is increased to the temperature of the opaque state or more from an ordinary temperature, the material is changed from the transparent state to the opaque state. Then, even if the temperature is returned to the ordinary temperature, the opaque state is maintained as it is. Also, if the temperature of the material is increased to the range of the temperature of the transparent state from the ordinary temperature and returned to the ordinary temperature, the material is changed from the opaque state to the transparent state and the transparent state is maintained as it is. The thickness of the variable layer can be set in the range that the visibly confirmable contrast between the opaque and transparent states, and the thickness of about several µm to 100 µm is favorable.

The material of the variable layer used in this embodiment can be made transparent only in the limited range of a temperature. The width of the temperature showing the change and that of humidity can be controlled, depending on the material. In this case, there is used a material, which is made transparent at 60° C. to 100° C. and opaque at 120° C. to 150° C.

Also, as a variable recording layer material, any materials can be used if they are material whose coloring characteristics can reversibly change such as photochromic material, high polymatic liquid crystal material, etc.

Figure 2:
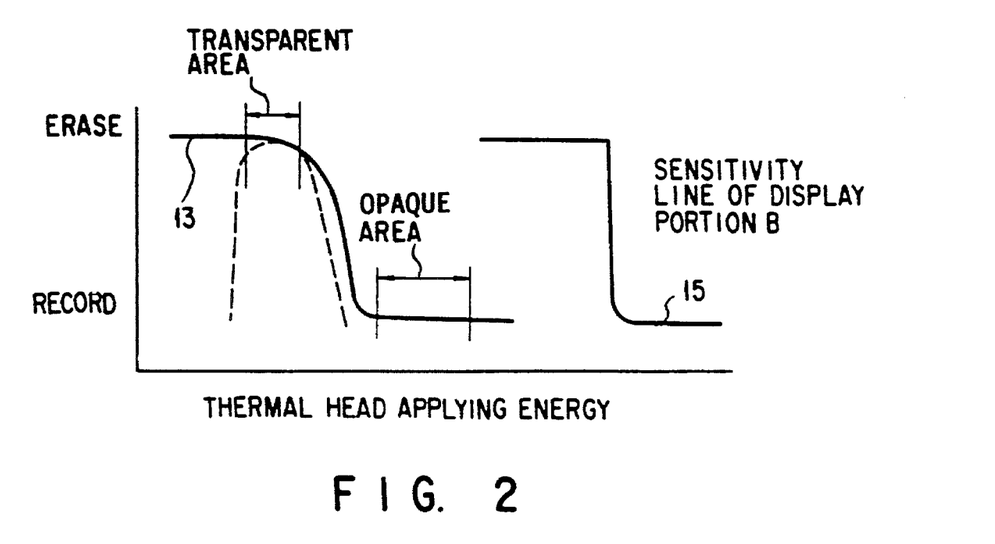
FIG. 2 is a characteristic view showing a recording characteristic of a display portion of the recording medium of FIG. 1.

The following will explain the recording characteristic of the display portion A of the recording media of FIG. 1 and that of display portion B with reference to FIG. 2.

Reference numerals 13 and 15 shown in FIG. 2 show recording characteristics of the display portions A and B which can be obtained by thermal head recording means having resolution of 8 dots (heating element)/mm. A horizontal axis shows applying energy to the thermal head, and a vertical axis shows a printing density. In the display portion A, the opaque state is recorded, and the transparent state is erased, and in the display portion B, the melted and broken portion of the tin thin layer is recorded. The vertical axis of FIG. 2 is shown based on the above conditions.

Proper energy for the the variable recording layer of the display portion A is about 0.4 mJ/dot, and that of the display portion B is about 0.8 mJ/dot. If the recording energy of about 0.8 mJ/dot of the display portion B is applied to the display portion A, the state change mechanism of the variable recording layer is broken, and the variable recording layer is in the transparent state, and no state change of opaque-transparent is not shown. Even if the recording energy of about 0.4 mJ/dot of the display portion A is applied to the display portion B, no recording is performed.

An image recording in the display portion A can be erased by about 0.2 mJ/dot. The feature of the present invention lies in the point that the plurality of display portions having different recording characteristics. The recording (opaque) energy and the erasing (transparent) energy, which are the recording condition of the display portion A, and the recording energy, which is the recording energy of the display portion B, are stored, in advance, in the magnetic recording layer of the recording medium together with data of the areas for forming the display portions A and B.

In the recording medium of the present invention, the recording energy of two display portions differs. Due to this, even in the case that the recording condition of either one of the display portions is found out and the display of one surface can be altered, the display function is broken or the recording cannot be performed as mentioned above even if an operator will perform the recording in the other surface under the same condition, thereby making it more difficult to alter the display recording of the display portion.

Moreover, the display portion B is formed of recording material of an additional type, and the display portion A is formed of recording material, which can be reversibly recorded/erased. The recording characteristic of the recording medium of the present invention includes such a function in addition to the recording energy. The combination of the display portion of the additional type of the recording and the display portion of the reversible recording is particularly favorable. By use of this combination, temporarily storing data, which is representative of historical data of the recording medium to be repeatedly used, can be effectively displayed in the display portion of the reversible recording. Also, permanent storing data can be effectively displayed in the display portion of the additional typed recording. In the case that the recording medium is formed of the display portion of the additional typed recording and the display portion of the reversible recording as shown in FIG. 1, it is desirable that the display area of the display portion of the additional typed recording be larger than that of the display portion of the reversible recording.

As a material for forming the display portion of the additional typed recording having higher certainty of printing than the reversible recording, there can be used not only metal breakage heat-sensitive recording layer 5 shown in the above embodiment but also diazo or leuco heat-sensitive recording material, thermal transferring recording material, toner image forming material, etc.

The following will explain a second method for processing the recording to the display portion using the recording medium having the display portion having high certainty of printing so as to record predetermined history data onto the image display portion having higher certainty of printing.

Figure 3A:
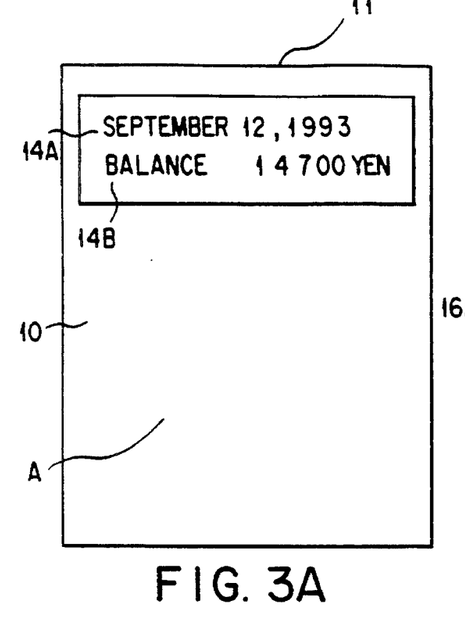
FIGS. 3A to 3D are views showing a display content of the display portion of the recording medium of FIG. 1.
Figure 3B:
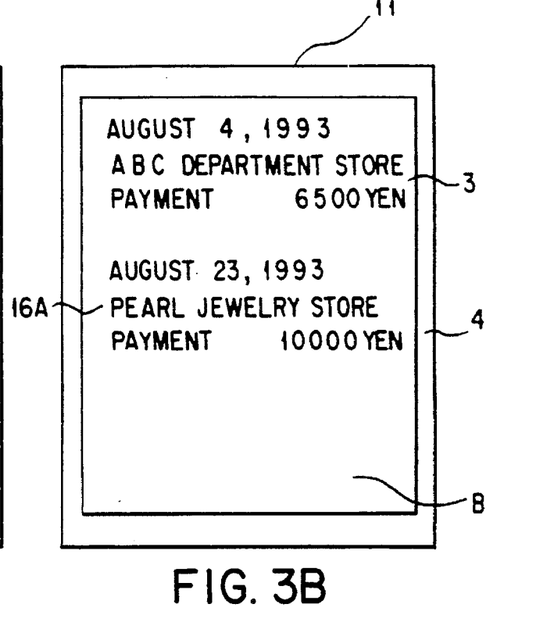
Figure 3C:
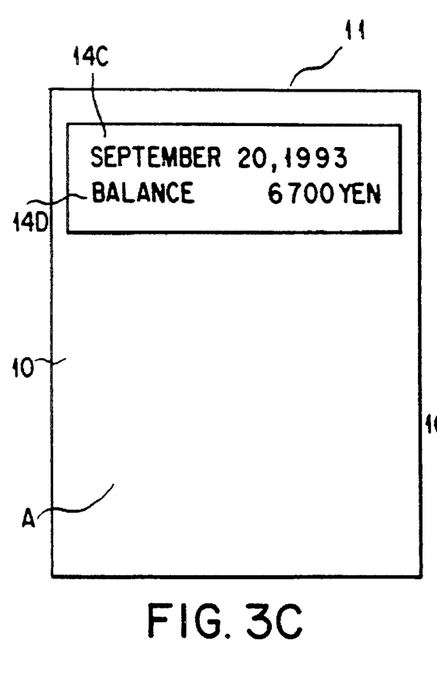
Figure 3D:
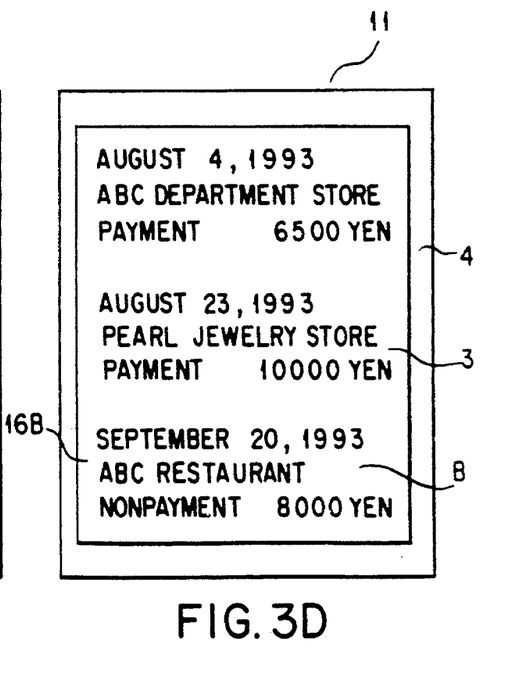

FIGS. 3A and 3B show a display state of the display portion when the prepaid card, serving as the recording medium of FIG. 1, is used. FIG. 3A shows the display state before the recording to the display portion is performed by the second method for processing, and FIG. 3B shows the display state after processing. In FIG. 3A, the recording medium 11 is shown from the direction A and B, respectively. The left shows the display state of the display portion A of the variable recording layer and the right shows the display state of the display portion B of the metal breakage heat-sensitive recording layer having higher certainty of printing than the display portion A. On the display portion A, the latest use date (Sep. 12, 1993) and the present balance are recorded and displayed. On the display portion B, a predetermined historical data is recorded. The history in which the used amount of money (payment in the figure) exceeds 5000 Yen is recorded in the form of the use date, a name of a store, and the used amount of money.

In FIG. 3B, on the recording medium 11, balance (Sep. 20, 1993) 6, 8 and historical data 4 are shown.

Figure 4:
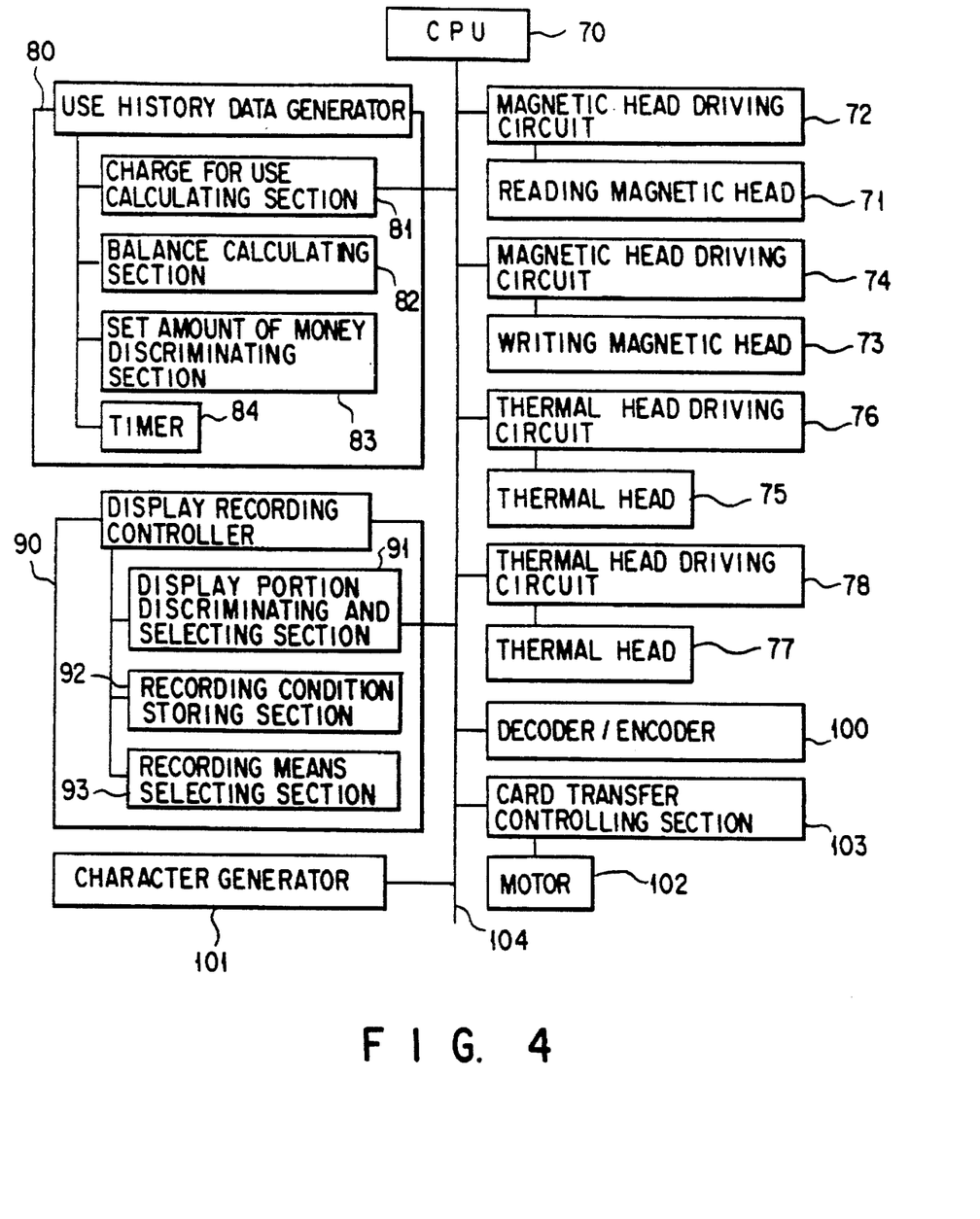
FIG. 4 is a block diagram showing a main structure of a processor used in a second display portion record processing method of the present present invention.
Figure 5:
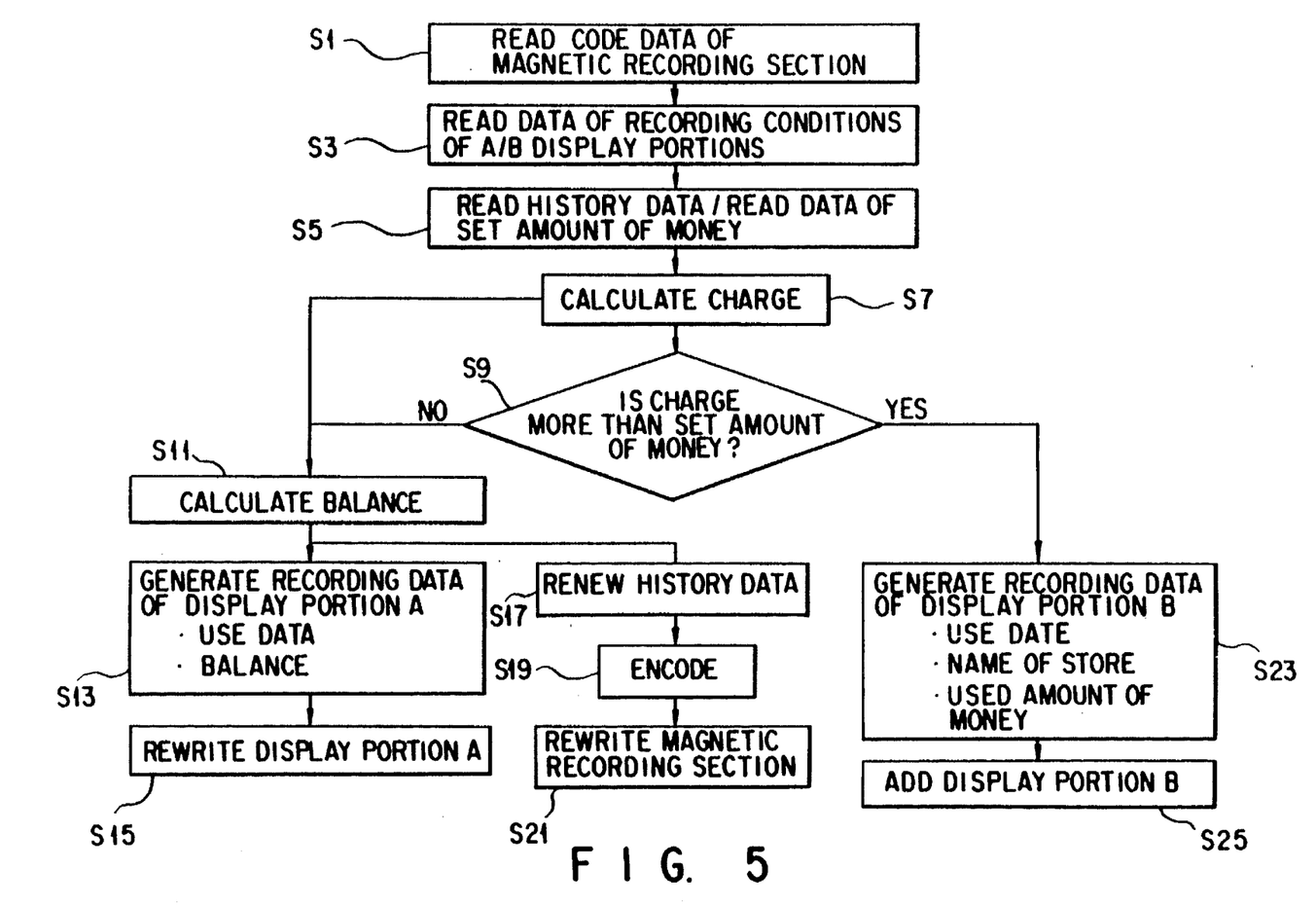
FIG. 5 is a flow chart showing the flow of the processing by the processor of FIG. 4.

The processing operation will be explained with reference to FIGS. 4 and 5. FIG. 4 is a block diagram showing the structure of the function of the processor for processing the recording, and FIG. 5 is a flow chart showing the record processing.

In FIG. 4, the processor comprises a CPU 70 for controlling the entire processor, a reading magnetic head 71 for reading magnetic code data of the magnetic recording layer 2, a driving circuit 72 of the reading magnetic head, a writing magnetic head 73 for writing magnetic code data to the magnetic recording layer 2, a driving circuit 74 of the writing magnetic head, a thermal head 75 for printing to the display portion A, a driving circuit 76 for the thermal head 75, a thermal head 77 for printing to the display portion B, and a driving circuit 78 for the thermal head 77.

Further, there is provided a use historical data generator 80 for controlling generating use historical data of the prepaid card comprising a calculating section 81 for calculating a using charge, a balance calculating section 82, a discriminating section 83 for discriminating a set amount of money, and a timer 84. A display recording and controlling section 90 is provided to select the display portion where data is recorded, select recording means, and set a recording condition. The section 90 comprises a display discriminating and selecting section 91, a recording condition storing section 92, and a recording means setting portion 93. Moreover, there is provided a decoder/encoder 100 for decoding encoded data or encoding data to be stored to the magnetic recording layer again. The decoder/encoder 100 is driven by a character generator 101 for generating bit map data from a character code data, a motor 102, which is a driving source of a transferring system of the prepaid card, and a card transfer controlling section 103.

Each signal of the respective sections is inputted/outputted to/from each section through a bus 104. These signals are controlled by CPU.

The following will explain the method for the record processing of the display portion with reference to the flow chart of FIG. 5.

The card is put into the processor at the time of the payment, and fixed data such as personal confirmation data, data of a using limit of the sum of money, data of set amount of money, which is predetermined historical data "Charge for Use (Payment) 5000 Yen or More" fixed in advance together with use historic data such as the present balance, display portion position data, and recording condition data as code data are read from the magnetic recording layer 2 by the reading magnetic head 62 and the magnetic head driving circuit 72 (Steps S1, S3, and S5).

These data are decoded by the decoder/encoder 100. Use historic data and data of set amount of money are inputted to the generator 80, and display portion position data, recording condition data are inputted to the controlling section 90. In the generator 80, the used amount of money is calculated by the calculating section 81 (S7). In this example, it is shown that the used amount of money is 8000 Yen. A balance is calculated from the calculation result and balance data read from the magnetic recording layer 2 (S11). In this example, "6700 Yen" is shown. At the same time, it is discriminated whether or not payment can be performed (S9).

Also, time data of "Sep. 20, 1993" is generated by the timer 53. In addition, data of name of store "ABC Restaurant" is generated (S13). These data are added to read data, and use history data is renewed (S17). Renewed use history data is encoded by decoder/encoder 100 (S19), and written to the magnetic recording layer 2 of the card by the writing magnetic head 73 and the driving circuit 74 (S21).

The charge for use is inputted to the discriminating section 83 for discriminating a set amount of money, and the setting condition "Charge for Use (Payment) 5000 Yen or More" read from the card is discriminated (S9). A discrimination signal of the discriminating section 83 is inputted to the display recording and controlling section 90. The display discriminating and selecting section 91 selects both display portion (display portion B) of the recording layer having high certainty of printing and the other display portion (display portion A) based on the above inputted signal if the setting condition is satisfied. If the setting condition is not satisfied, the section 91 selects the other display portion (display portion A) (S9).

The recording means setting section 93 sets thermal head recording means to be driven and displaying items based on the selection signal. On the display portion of the recording layer having high certainty of printing, "Use date, Name of Store, and Used Amount of Money" are displayed. On the other display portion, "Latest Use Date, Balance" are set. The recording condition, which is read from the magnetic recording layer of the card and stored in the storing section 92, is read based on the signal of the recording means setting section 93. Then, recording to the display portion of the card is performed.

In this embodiment, the charge for use is "8000 Yen", and satisfies the setting condition, such data is recorded onto both display portions A and B.

Regarding the recording to the display portion B of the metal breakage heat-sensitive recording layer having certainty of printing, recording energy of 0.8 mJ/dot is read from the recording condition storing section 92. Data "Sep. 20, 1993, ABC Restaurant, Payment: 8000 Yen", which is generated by the generator 80 and set by the setting section 93, is converted to bit map data by the character generator 101 (S23).

Then, the recording to the display portion B of the card is performed. Under the control of the CPU 70 based on display portion position data, the thermal head 77, serving as thermal recording means, adds display portion recording data converted to bit map data to the display portion B in the recording condition of the display portion B provided to the thermal head driving circuit 78 (S24).

Regarding the recording to the display portion A of the reversible heat-sensitive recording layer, recording energy of 0.4 mJ/dot, which is the recording condition of the display portion A, and erasing energy of 0.2 mJ/dot are read from the recording condition storing section 92. Recording data of the display portion A "Sep. 20, 1993, Balance: 6700 Yen", which is generated by the generator 80 (S13) and set by the setting section 93, is converted to bit map data by the character generator 101 (S15).

Then, the recording to the display portion A of the card is performed. Under the control of the CPU 70 based on display portion position data, the thermal head 75, serving as thermal recording means, rewrites display portion recording data converted to bit map data to the display portion B in the recording condition of the display portion A provided to the thermal head driving circuit 76 (S25). The rewrite recording is performed by the above-mentioned overwrite recording system. The display portions A and B are rewritten by the display portion recording processing, and displayed as shown in FIGS. 3A and 3B.

As mentioned above, according to the display portion recording processing method, data of the item to be stored is designated as predetermined data, stored to the storing section of the recording medium. Then, the condition is read, and the recording to the display portion can be performed in accordance with the read condition. Therefore, the display item can be allocated in accordance with the recording ckaracteristic of the display portion, and displayed.

Figure 6:
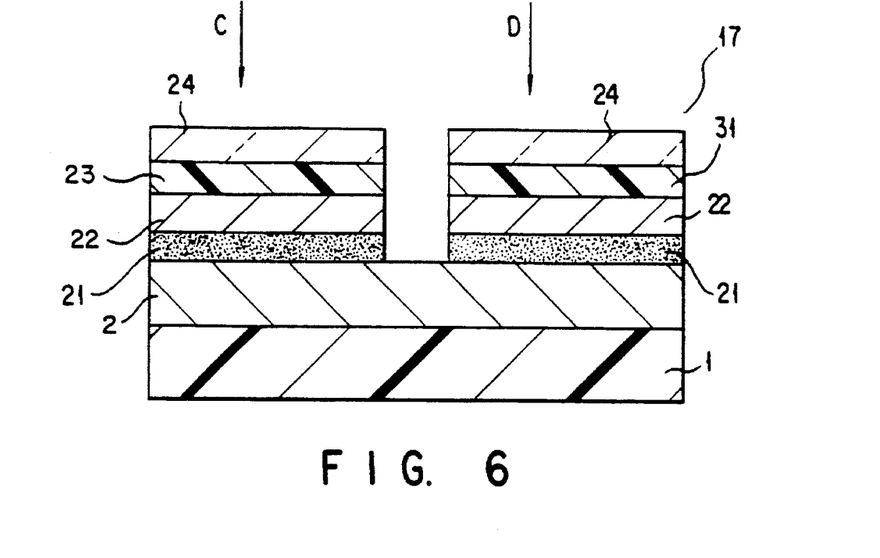
FIG. 6 is a cross sectional view schematically showing a recording medium of a second embodiment of the present invention.

The following will explain the recording medium having two display portions, which can be reversibly recorded/erased, of the present invention with reference to FIG. 6.

FIG. 6 is a cross sectional view schematically showing the recording medium of the second embodiment of the present invention. In FIG. 6, a recording medium 17 is formed by bonding a first variable recording display portion A (hereinafter called as display portion C), which is provided to be perpendicular to an arrow C and a second variable recording display portion B (hereinafter called as display portion D), which is provided to be perpendicular to an arrow D, to a magnetic medium, serving as a storing section, providing the one of the surfaces of the base material 1 having having a thickness of about 10 μm to several mm, and being formed of white vinyl chloride and polyester.

In FIG. 6, the display portion C comprises a bonding layer 21, a reflection layer 22, made of an aluminum thin layer, a variable recording layer 23, and a protection layer 24. The structure of the display portion D is the same as that of the display portion C excepting that a variable recording layer 31 has a different recording characteristic from the recording characteristic of the variable recording layer 23 as described later.

The variable recording layers 23 and 31 use the same material as used in the variable recording layer 8 of the memory medium shown in FIG. 1. In other words, the material reversibly shows the obscure state and the transparent state, depending on the temperature. Since the operation of the basic state change is the same as made in the explanation of the memory medium of FIG. 1, the explanation will be omitted.

In the magnetic recording layer 2, there are stored fixed data in which the use of the recording medium is specified, for example, a sum of money, which can be used in a case of a prepaid card, and variable data of history of the use, for example, the remainder of the money, usable date. Further, in the recording medium of the present invention, a recording condition of the display portion is stored.

On the display portions C and D, data of the history of the use. The feature of the recording medium 17 lies in the point that the display portions C and D are provided on the same surface of the base material 1, and they have a different recording characteristic to be explained later.

The recording characteristics of the display portions C and D of the recording medium will be explained with reference to FIG. 7.

Figure 7:
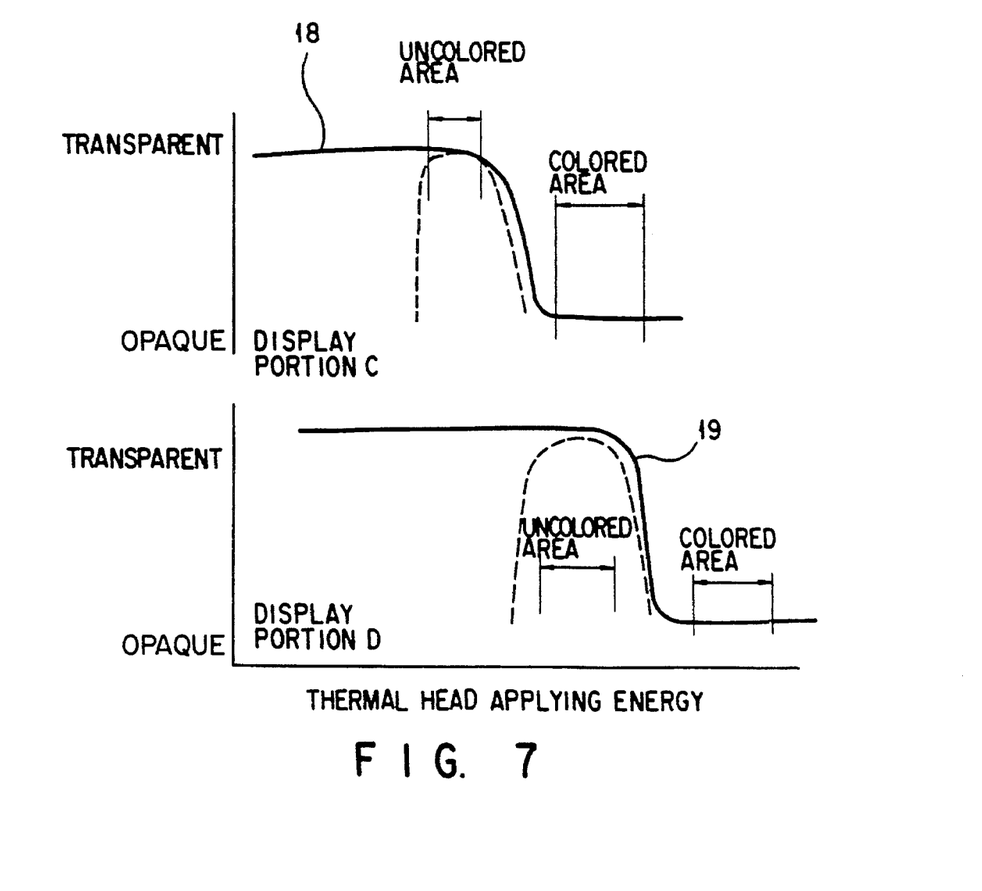
FIG. 7 is a characteristic view showing a recording characteristic of a display portion of the recording medium of FIG. 6.

FIG. 7 shows recording characteristics 18 and 19 obtained by thermal head recording means having resolution of 8 dots (heat element)/mm. A horizontal axis shows apply energy to the thermal head, and a vertical axis shows a printing density. Moreover, the obscure state of the variable recording portion is shown by a colored (recorded) area and the transparent state is shown by a uncolored (erased) area.

In the display portion C, a proper recording energy is about 0.4 mJ/dot and the erasing energy is 0.2 mJ/dot. In the display portion D, a proper recording energy is about 0.6 mJ/dot and the erasing energy is 0.4 mJ/dot. If an operator will perform recording to the display portion D by the recording energy of the display portion C, which is about 0.4 mJ/dot, an image recorded and displayed on the display D is erased. Also, if the operator will perform the recording to the display portion D by the recording energy of the display portion D, which is about 0.6 mJ/dot, the state change mechanism of the variable recording layer of the display portion C is broken, and the transparent state is shown, and the obscure-transparent state is not shown.

On the other hand, if the operator will erase the recording image of the display portion C by the erasing energy of the display portion D, which is about 0.4 mJ/dot, the recording image results in being recorded conversely. According to this recording this recording medium, the recording condition of the display portion C is substantially the same as the erasing condition of the display portion D, thereby making it possible to difficult to alter the image of the display portion. In this way, even in the recording image of the display portion of the reversible recording having low certainty of printing, security of the image of the display portion can be maintained.

The recording (obscure) energy and the erasing (transparent) energy, which are recording conditions of the display portions C and D, are stored in the magnetic recording layer of the recording medium together with data of the area for forming the display portions C and D are formed in advance.

Figure 8A:
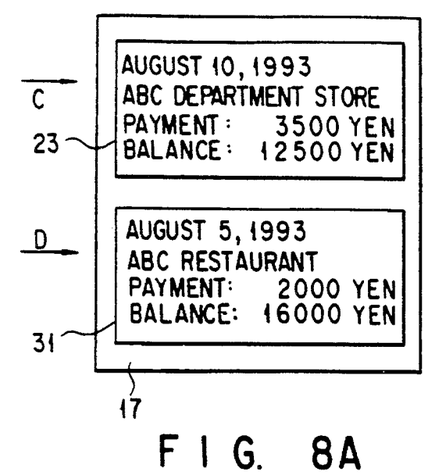
FIGS. 8A and 8B are views showing a display content of the display portion of the recording medium of FIG. 6.
Figure 8B:
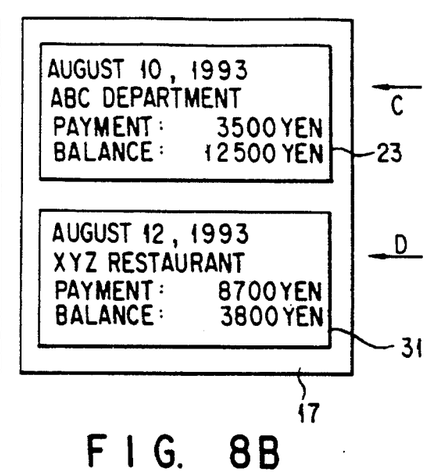

FIGS. 8A and 8B are views schematically showing the display portion when the recording medium of FIG. 6 is used as a prepaid card. An upper stage 23 shows the display portion C, and a lower stage 31 shows the display portion D. On each of the display portions C and D, the use date, the name of the store, and the used amount of money, and the usable balance are recorded and displayed. FIG. 8A shows the states of the display portions C and D before the payment at the XYZ restaurant. In these states, there is shown historical data in which the display of the display portion D is older than that of the display portion C.

Figure 9:
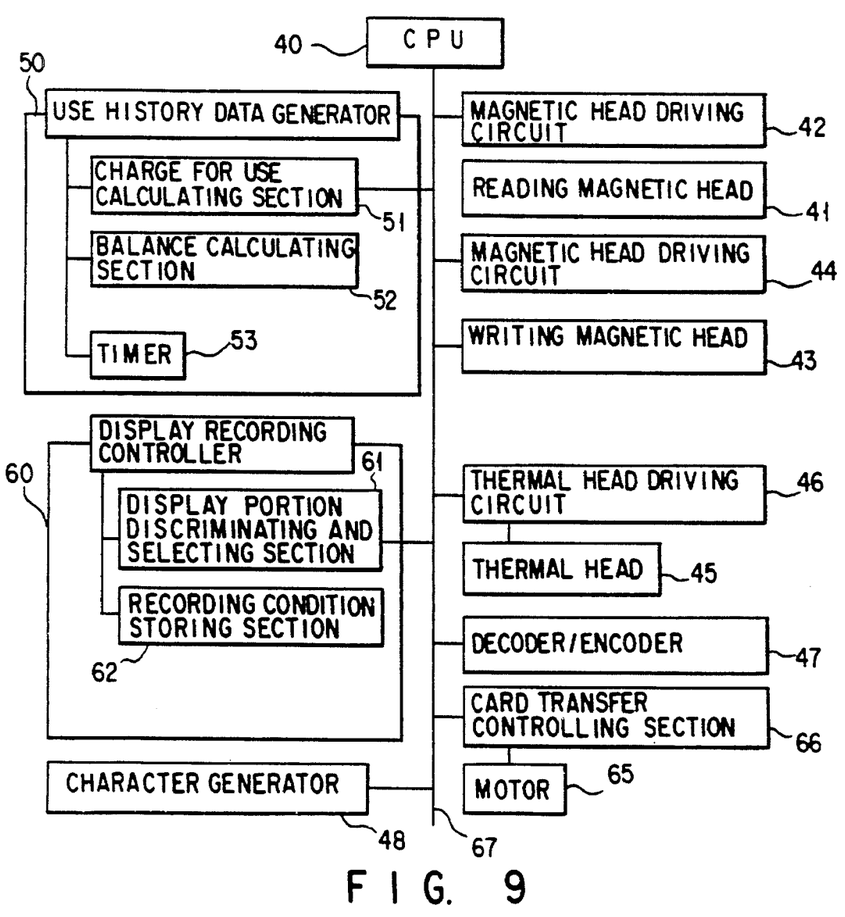
FIG. 9 is a block diagram showing a main structure of a processor used in a first display portion record processing method of the present present invention.
Figure 10:
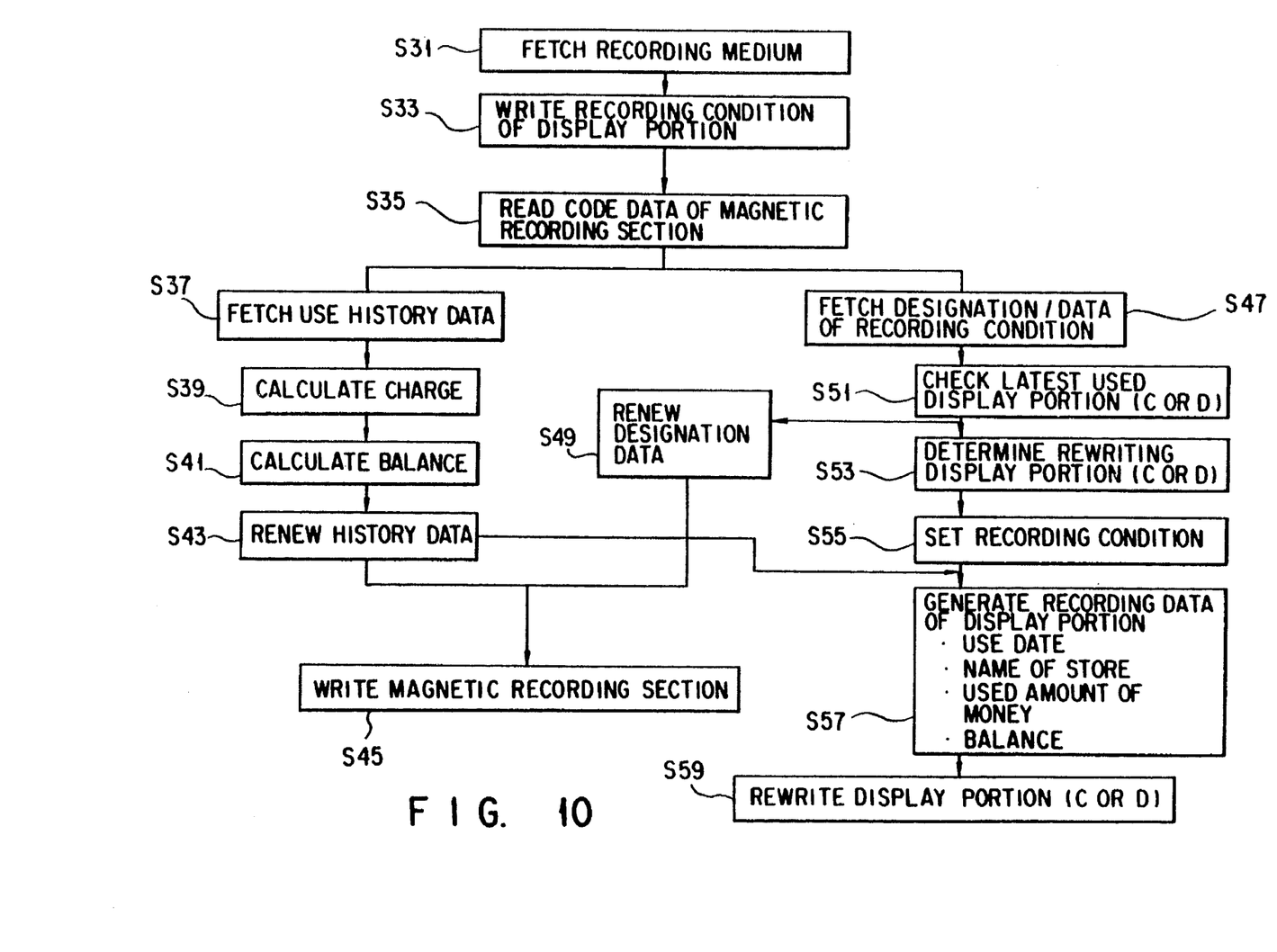
FIG. 10 is a flow chart showing the flow of the processing by the processor of FIG. 9.

The following will specifically explain the first display portion recording processing method of the present invention as an example of the rewriting operation of the display portion when the prepaid card is used at the XYZ restaurant, with reference to FIGS. 9 and 10. The first display portion recording processing method is characterized in that the recording medium 17 is used, data of the recording condition stored in the recording section of the recording medium at the time of recording is read from the recording section, and the recording condition of printing means is set. FIG. 9 is a block diagram showing the functional structure of the apparatus for processing the record of data of the displaying portion, and FIG. 10 is a flow chart showing the flow of the record processing.

In FIG. 9, a CPU 40 for controlling the entire apparatus is connected to a reading magnetic head 41 for reading magnetic code data of the magnetic recording layer 2, a driving circuit 42 of the reading magnetic head, a writing magnetic head 43 for writing magnetic code data to the magnetic recording layer 2, a driving circuit 44 of the writing magnetic head, a thermal head 45 for printing to the display portion, a driving circuit 46 for driving the thermal head 45, a decoder/ encoder 47 for decoding coded data or encoding data to be stored to the magnetic recording layer again, and a character generator 48 for generating bit map data from character code data. Then, the CPU 40 controls each operation.

A use history data generator 50 for controlling and generating use history data of the prepaid card comprises a calculating section 51 for calculating charge for use, a calculating section 52 for calculating balance, and a timer 53. A display recording controller 60 comprises a display portion discriminating and selecting section 61, and a recording condition storing section 62. A motor 65, serving as a driving source of a transfer system of the prepaid card is driven by a card transfer controlling section 66. A signal of each section is inputted/outputted to each section through a bus 67, and these signals are controlled by the CPU 40.

The following will explain the method for processing the recording of the display portion along a flow chart shown in FIG. 10.

The card is inputted to the processor at the time of the payment. Then, display portion position data, recording condition data, and data of the display portion finally recorded are read as code data together with use history data such as a present balance, fixed data such as personal confirmation data from the magnetic recording layer 2 of the card, and data of a using limit of the sum of money by use of the reading magnetic head 41 and the magnetic head driving circuit 42 (S33, S35, S37, S47).

Data of use history is decoded by the decoder/ encoder 47, and inputted to the use history data generator 50. Then, the amount of money used by shopping is calculated by the calculating section 51 (S39). In this case, the amount of money is "8700 Yen." Then, the balance "3800 Yen" is calculated from data of the present balance read from the card and the used amount of money by the calculating section 52 (S40). At the same time, it is discriminated whether or not payment can be performed.

Also, time data of "Aug. 12, 1993" is generated by the timer 53. In addition, data of name of store "XYZ Restaurant" is generated. These data are added to read data, and use history data is renewed (S43).

On the other hand, display portion position data, recording condition data, and data of the display portion finally recorded are decoded by the decoder/encoder 47, and inputted to the display recording controller 60. The recording condition is stored in the recording coniditon storing section 62. Then, the display portion discriminating and selecting section 61 discriminates that the display portion finally recorded is the display portion C or D based on data of the display portion finally recorded and display portion designation data (S51). It is discriminated that the display portion finally recorded is the display portion C (see FIG. 8A), and it is determined that he display portion to be rewritten is the display portion D (S53).

In accordance with the above determination, the recording conditions of the display portion D, that is, recording energy of 0.6 mJ/dot, and erasing energy of 0.4 mJ/dot are read from the recording condition storing section 62. The display portion recording data, which is generated by the generator 50, that is, "Aug. 1993, XYZ Restaurant, Payment: 8700 Yen, Balance: 3800 Yen", is converted to bit map data by the character generator 48 (S48).

Then, the recording to the display portion D of the card is performed. Under the control of the CPU 40 based on display portion position data, the thermal head 45, serving as thermal recording means, rewrites display portion recording data converted to bit map data to the display portion D in the recording condition of the display portion D provided to the thermal head driving circuit 46 (S59). The rewrite recording is performed by the overwrite recording system in which recording energy is provided to the heat element corresponding to the recording section and erasing energy is provided to the heat element corresponding to the erasing section such that the recording and erasing are simultaneously performed. The details of this recording system are described in Japanese Patent Application KOKAI Publication 4-197647. By this rewriting, the display portion D is rewritten and displayed as shown in FIGS. 8A to 8B.

The following will explain the rewriting steps by the overwrite recording system.

The thermal head 45 is fixed, and the storing medium of the present invention, that is, the heating member line, comprising a plurality of heating members is transferred under the heating member line in a fixed direction. At this timer if the area (obscure area) where printing of print images to be newly formed is needed comes in contact with the heating members of the heating member line of the thermal head, the heating members is heated by supplying the current-supply pulse thereto through the thermal head driving circuit 46 so as to heat the recording energy by the control of the CPU 40. Or, if the area (transparent area) where printing of print images to be newly formed does not exist comes in contact with the heating embers of the heating member line of the thermal head, CPU 40 controls the heating members of the thermal head to heat the erasing energy. The heating members of the thermal head are selectively made in accordance with each area of the new print image, thereby making it possible to rewrite the images on the medium at a time without taking the step of recording the new image after erasing all past images on the medium.

Then, renewed use history data and renewed display portion designation data (S49) are encoded by the decoder/encoder 47, and written to the magnetic recording layer 2 of the card by the writing magnetic head 43 and the driving circuit 44 (S45).

According to the recording medium 17 of the present invention, since the recording conditions of the display portion recorded in the recording section in advance is read and the recording of the display portion is performed in accordance to the read recording conditions, the recording can be stably performed even if the recording characteristics of the display portion of the recording medium differ.

In the recording medium of the present invention, the recording energy of two display portions differs. Due to this, even in the case that the recording condition of either one of the display portions is found out and the display of one surface can be altered, the display function is broken or the recording cannot be performed as motioned above even if the operator will perform the recording in the other surface under the same condition, thereby making it more difficult to alter the display recording of the display portion, and improving the security of the recording medium. Also, the combination of the display portion of the additional type of the recording and the display portion of the reversible recording is particularly favorable. By use of this combination, temporarily storing data, which is representative of historical data of the recording medium to be repeatedly used, can be effectively displayed in the display portion of the reversible recording. Also, permanent storing data can be effectively displayed in the display portion of the additional typed recording.

Moreover, even if the plurality of the display portions are all reversible recording typed display portions, at least one portion is made in common in the recording condition of one display portion and the erasing condition of the other display portion, thereby making it difficult to alter the image. In this way, even in the recording image of the display portion of the reversible recording having low certainty of printing, security of the image of the display portion can be maintained by making the recording characteristic different.

According to the method for processing the display portion recording of the present invention, since the recording conditions of the display portion recorded in the recording section in advance is read and the recording of the display portion is performed in accordance to the read recording conditions, the recording can be stably performed even if the recording characteristics of the display portion of the recording medium differ.

Moreover, according to the method for processing the display portion recording of the present invention, data of the item to be stored is designated as predetermined data, stored to the storing section of the recording medium. Then, the condition is read, and the recording to the display portion can be performed in accordance with the read condition. Therefore, the display item can be allocated in accordance with the recording characteristic of the display portion, and displayed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data storing medium comprising:

a substrate;

a first display portion, provided on said substrate, for displaying predetermined data, said first display portion having recording material storing said data by first recording energy, and erasing said stored data of history of the use by predetermined erasing energy; and a second display portion, provided on said substrate, for displaying predetermined data, said second display portion having recording material for storing said data by a second recording energy different from said first recording energy, and erasing said data by second erasing energy different from said first erasing energy.

2. A data storing medium according to claim 1, wherein said first and second display portions are arranged on the same surface of said substrate, said first and second display portions including first and second thermal recording materials each showing reversibly a transparent state and a obscure state by a temperature, and said first and second thermal recording materials have a different operational range.

3. A data storing medium according to claim 1, further comprising a recording portion for recording a value of said first recording energy, a value of said erasing energy, and a value of said second recording energy.

4. A method of processing a data storing medium which having a first display portion, provided on a substrate, for displaying predetermined data, said first display portion having recording material storing said data by first recording energy, and erasing said stored data of history of the use by predetermined erasing energy, and a second display portion, provided on said substrate, for displaying predetermined data, said second display portion having recording material for storing said data by a second recording energy different from said first recording energy, and erasing said data by second erasing energy different from said first erasing energy, comprising the steps of:

discriminating which display portion of said first and second display portions should be rewritten; and rewriting first or second predetermined data of said first or second display portion in accordance with the discrimination result of said discriminating step based on said first recording energy, or said second recording energy, or said erasing energy.

5. A method according to claim 4, further comprising the steps of:

reading at least one of said recording energy stored in said first display portion before said discriminating step and said erasing energy and said second recording energy.

6. A method according to claim 4, wherein a value of said first recording energy being substantially the same as a value of said second erasing energy.

* * * * *